United States Patent
Aoto et al.

(10) Patent No.: US 9,530,547 B2
(45) Date of Patent: Dec. 27, 2016

(54) LAMINATED PTC THERMISTOR ELEMENT

(71) Applicant: MURATA MANUFACTURING CO., LTD., Nagaokakyo-shi, Kyoto-Fu (JP)

(72) Inventors: Wataru Aoto, Nagaokakyo (JP); Yumin Saigo, Nagaokakyo (JP); Hayato Katsu, Nagaokakyo (JP); Yasuhiro Nabika, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 138 days.

(21) Appl. No.: 14/565,495

(22) Filed: Dec. 10, 2014

(65) Prior Publication Data

US 2015/0091690 A1    Apr. 2, 2015

Related U.S. Application Data

(63) Continuation of application No. PCT/JP2013/069459, filed on Jul. 18, 2013.

(30) Foreign Application Priority Data

Jul. 25, 2012 (JP) .................. 2012-164384

(51) Int. Cl.
*H01C 7/10* (2006.01)
*H01C 7/02* (2006.01)
(Continued)

(52) U.S. Cl.
CPC ............. *H01C 7/025* (2013.01); *C04B 35/468* (2013.01); *H01C 1/012* (2013.01); *H01C 7/008* (2013.01);
(Continued)

(58) Field of Classification Search
CPC .......... H01C 7/025; H01C 7/08; H01C 7/021; H01C 7/012
(Continued)

(56) References Cited

U.S. PATENT DOCUMENTS 6,544,443 B2 * 4/2003 Niimi ................ C04B 35/468
                                                   252/518.1
6,984,355 B2 * 1/2006 Niimi ................... H01C 7/025
                                                   156/89.14
(Continued)

FOREIGN PATENT DOCUMENTS

JP    07-045402    2/1995
JP    11-116327    4/1999
(Continued)

OTHER PUBLICATIONS

PCT/JP2013/069459 Written Opinion dated Aug. 5, 2013.
PCT/JP2013/069459 ISR dated Aug. 5, 2013.

*Primary Examiner* — Kyung Lee
(74) *Attorney, Agent, or Firm* — Arent Fox LLP

(57) ABSTRACT

A laminated PTC thermistor element that includes a ceramic substrate including a plurality of ceramic layers, a plurality of internal electrodes within the ceramic substrate, and external electrodes on the surface of the ceramic substrate that provide electrical conduction to the internal electrodes. The ceramic substrate is 0.3 [μm] or more and 1.2 [μm] or less in average porcelain grain size. Furthermore, the relative density of the ceramic substrate has a lower limit of 70 [%], and an upper limit of −6.43d+97.83 [%] when the average porcelain grain size is denoted by d.

7 Claims, 5 Drawing Sheets

(51) Int. Cl.
*C04B 35/468* (2006.01)
*H01C 1/012* (2006.01)
*H01C 7/00* (2006.01)

(52) U.S. Cl.
CPC ....... *H01C 7/021* (2013.01); *C04B 2235/3224* (2013.01); *C04B 2235/77* (2013.01); *C04B 2235/785* (2013.01)

(58) Field of Classification Search
USPC .......................................... 338/22 SD, 22 R
See application file for complete search history.

(56) References Cited

U.S. PATENT DOCUMENTS

| | | | | |
|---|---|---|---|---|
| 7,764,161 B2* | 7/2010 | Katsu | ................ | C04B 35/4682 252/500 |
| 8,289,125 B2* | 10/2012 | Kishimoto | .......... | C04B 35/4682 252/511 |
| 8,339,237 B2* | 12/2012 | Kajino | ................ | C01G 31/006 338/20 |
| 8,350,662 B2* | 1/2013 | Abe | ........................ | C04B 35/46 338/22 R |
| 8,536,973 B2* | 9/2013 | Lo | ............................ | H01C 7/13 338/22 R |
| 2003/0030192 A1 | 2/2003 | Niimi et al. | | |
| 2012/0056709 A1 | 3/2012 | Kajino et al. | | |
| 2014/0247107 A1* | 9/2014 | Aoto | .................... | C04B 35/468 338/22 SD |

FOREIGN PATENT DOCUMENTS

| | | |
|---|---|---|
| JP | 2001-130957 A | 5/2001 |
| JP | 2002-043103 A | 2/2002 |
| JP | 2012-059786 A | 3/2012 |

\* cited by examiner

| SAMPLE NUMBER | AVERAGE PORCELAIN GRAIN SIZE [μm] | ROOM-TEMPERATURE RESISTIVITY [Ω·cm] | RELATIVE DENSITY [%] | WITHSTANDING VOLTAGE [V/mm] | G/NG |
|---|---|---|---|---|---|
| 1 | 0.3 | 5 | 98 | 250 | NG |
| 2 | 0.3 | 14 | 96 | 780 | G |
| 3 | 0.5 | 15 | 95 | 770 | G |
| 4 | 0.6 | 15 | 94 | 760 | G |
| 5 | 0.8 | 15 | 93 | 760 | G |
| 6 | 1.0 | 16 | 92 | 750 | G |
| 7 | 1.2 | 18 | 92 | 690 | NG |
| 8 | 1.2 | 19 | 90 | 740 | G |
| 9 | 1.3 | 12 | 90 | 260 | NG |
| 10 | 1.3 | 22 | 78 | 690 | NG |
| 11 | 0.3 | 28 | 70 | 820 | G |
| 12 | 0.5 | 26 | 70 | 800 | G |
| 13 | 0.6 | 25 | 70 | 780 | G |
| 14 | 0.8 | 24 | 70 | 770 | G |
| 15 | 1 | 22 | 70 | 760 | G |
| 16 | 1.2 | 22 | 70 | 750 | G |
| 17 | 1.3 | 24 | 70 | 710 | NG |
| 18 | 0.3 | 78 | 67 | 980 | NG |
| 19 | 1.2 | 45 | 66 | 920 | NG |

| SIZE OF CERAMIC SUBSTRATE 2 | | | |
|---|---|---|---|
| SIZE | LENGTH L [mm] (DESIGN TARGET VALUE) | WIDTH W [mm] (DESIGN TARGET VALUE) | THICKNESS L [mm] (EXAMPLE OF DESIGN TARGET VALUE) |
| 3225 | 3.2 | 2.5 | 1.0 |
| 3216 | 3.2 | 1.6 | 1.0 |
| 2012 | 2.0 | 1.2 | 1.0 |
| 1608 | 1.6 | 0.8 | 1.0 |
| 1005 | 1.0 | 0.5 | 1.0 |
| 0603 | 0.6 | 0.3 | 1.0 |
| 0402 | 0.4 | 0.2 | 1.0 |

LAMINATED PTC THERMISTOR ELEMENT

CROSS REFERENCE TO RELATED APPLICATIONS

The present application is a continuation of International application No. PCT/JP2013/069459, filed Jul. 18, 2013, which claims priority to Japanese Patent Application No. 2012-164384, filed Jul. 25, 2012, the entire contents of each of which are incorporated herein by reference.

FIELD OF THE INVENTION

The present invention relates to a laminated PTC thermistor element which has positive temperature characteristics.

BACKGROUND OF THE INVENTION

Barium titanate based semiconductor porcelain which is applicable to the laminated PTC thermistor element mentioned above is described in, for example, Patent Document 1 below. This barium titanate based semiconductor porcelain is 0.9 μm or less in average porcelain grain size, 90 Ωcm or less in resistivity at room temperature (25° C.), and 720 V/mm or more in withstanding voltage intensity.

Patent Document 1: Japanese Patent Application Laid-Open No. 11-116327

SUMMARY OF THE INVENTION

In recent years, electronic devices (e.g., cellular phones and personal computers) which require overcurrent protection provided by PTC thermistor elements have been progressively advanced to be sophisticated. The sophisticated electronic devices require electronic components or the like which are high in capacity or able to be driven with large currents. Therefore, overcurrent protection capable of dealing with large currents has been required for PTC thermistor elements.

In order to deal with such overcurrent protection, the PTC thermistor elements are required to have an extremely low room-temperature resistivity in consideration of reduction in power loss during normal use, and ensure high withstanding voltage performance. However, due to a trade-off relationship between the room-temperature resistivity and withstanding voltage, there is a problem that it is difficult to achieve a balance therebetween. For example, conventional barium titanate based semiconductor porcelain is, because of the high room-temperature resistivity of 90 Ωcm, able to ensure withstanding voltage performance, but large in power loss during normal use.

Therefore, an object of the present invention is to provide a laminated PTC thermistor element which achieves a balance between a low room-temperature resistivity and a high withstanding voltage.

In order to achieve the object mentioned above, a first aspect of the present invention is a laminated PTC thermistor element including: a ceramic substrate including a plurality of ceramic layers; a plurality of internal electrodes formed within the ceramic substrate; and external electrodes formed on the surface of the ceramic substrate, for providing electrical conduction to the internal electrodes.

The ceramic substrate is 0.3 [μm] or more and 1.2 [μm] or less in average porcelain grain size. Furthermore, the relative density of the ceramic substrate has a lower limit of 70 [%], and an upper limit of −6.43d+97.83 [%] when the average porcelain grain size is denoted by d.

The aspect mentioned above makes it possible to provide a laminated PTC thermistor element which achieved a balance between a low room-temperature resistivity and a high withstanding voltage.

DETAILED DESCRIPTION OF THE INVENTION

A laminated PTC thermistor element according to an embodiment of the present invention will be described below with reference to the drawings.

(Introduction)

Figure 1A:
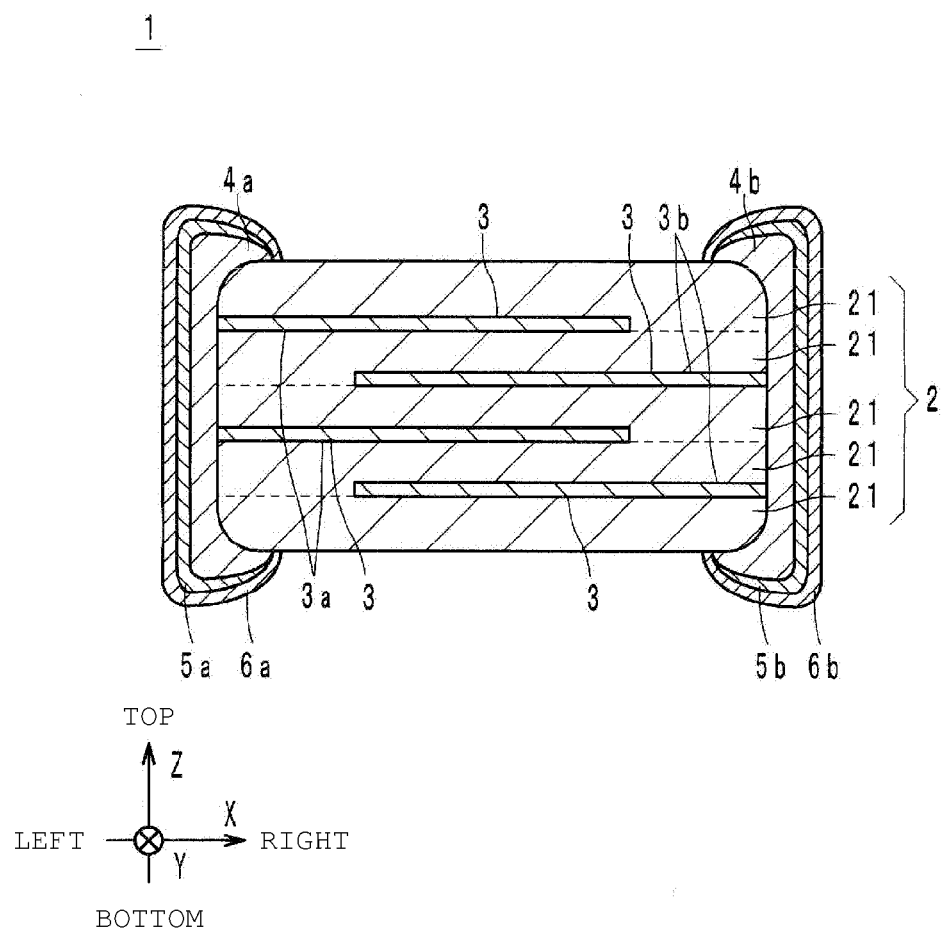
FIG. 1A is a front elevational view of a longitudinal section of a laminated PTC thermistor element according to an embodiment of the present invention.
Figure 1B:
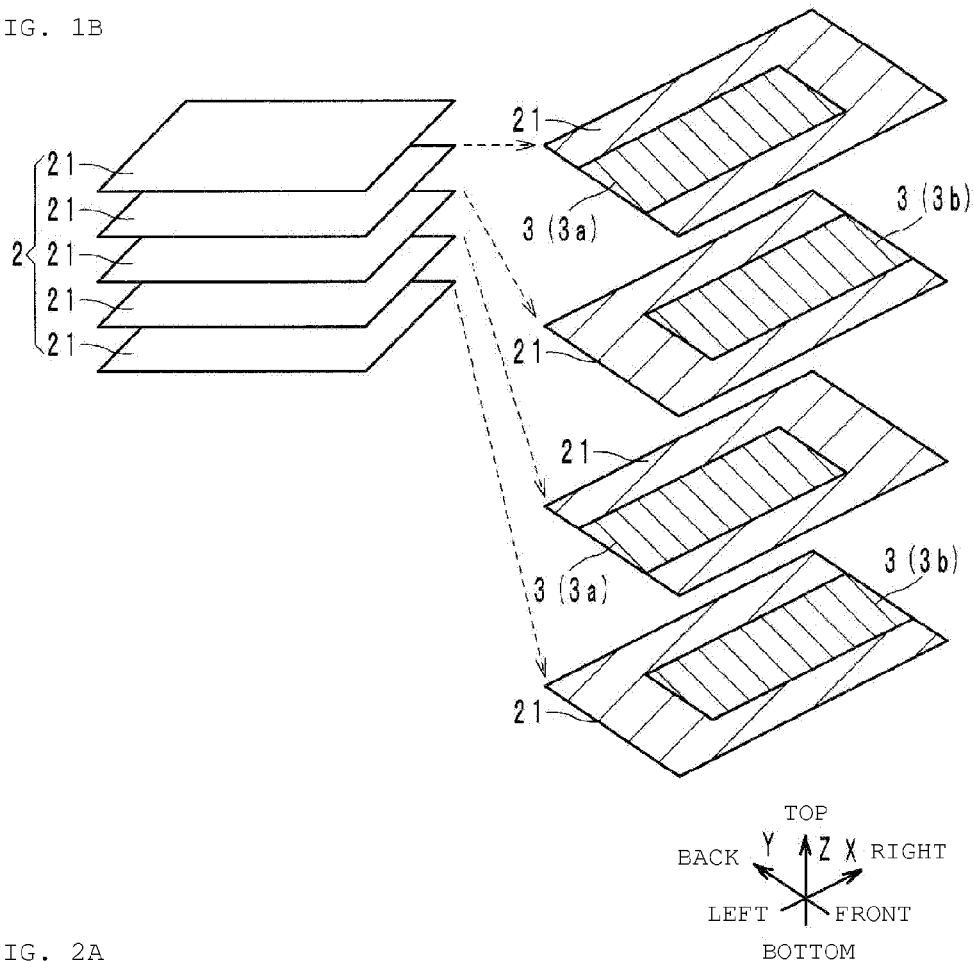
FIG. 1B is an exploded perspective view of the ceramic substrate shown in FIG. 1A.

First, for the purpose of illustration, the X axis, Y axis, and Z axis will be defined which are shown in FIGS. 1A and 1B. The X axis, Y axis, and Z axis respectively indicate the horizontal direction, front-back direction, and vertical direction of a laminated PTC thermistor element 1.

(Configuration of PTC Thermistor Element)

FIG. 1A shows, as an example, a finished product of a surface-mounted laminated PTC thermistor element 1. This laminated PTC thermistor element 1 includes a ceramic substrate 2, a plurality of internal electrodes 3, a pair of two external electrodes 4a, 4b, first plating films 5a, 5b, and second plating films 6a, 6b.

The ceramic substrate 2 has positive temperature characteristics, which is composed of, for example, a ceramic material of $BaTiO_3$ (barium titanate) with a predetermined additive added thereto. In this case, the additive is a rare earth, and typically, Sm (samarium). Besides, it is possible to use Nd (neodymium) or La (lanthanum) as the additive, for example.

The ceramic substrate 2 is, as shown in FIG. 1B, a laminated body obtained by vertically stacking a plurality of ceramic layers 21, and for example, horizontally long and approximately cuboidal in shape. In the case of the ceramic substrate 2 of 2012 size, the design target value L of the length in the horizontal direction is, for example, 2.0 [mm], the design target value W of the width in the front-back direction is, for example, 1.2 [mm], and the design target value T of the thickness in the height direction is, for example, 1.0 [mm]. In this case, the L, W, and T are not always exactly 2.0 [mm], 1.2 [mm], and 1.0 [mm], respectively, but have tolerances.

In the present embodiment, the ceramic substrate 2 is prepared so as to meet the following conditions (A), (B).

(A) The ceramic substrate 2 is 0.3 [μm] or more and 1.2 [μm] or less in average porcelain grain size d. In this case, the lower limit is adapted to 0.3 [μm] because it is difficult to manufacture the ceramic substrate 2 of less than the lower limit in average porcelain grain size. The upper limit of 1.2 [μm] is defined on the basis of experimental results (as will hereinafter be described in detail) obtained by the present inventors.

(B) The relative density R of the ceramic substrate 2 has a lower limit of 70 [%], and the relative density R has an upper limit L, which is a function of the average porcelain grain size d, and L=−6.43d+97.83 [%].

As will hereinafter be described in detail, the relative density R of the ceramic substrate 2 in excess of the upper limit L increases the grain boundaries, thus degrading the withstanding voltage. Alternatively, the relative density R below the lower limit of 70% increases the room-temperature resistivity. In other words, unless the conditions (A) and (B) mentioned above are met, the laminated PTC thermistor element causes failure to achieve a balance between a low room-temperature resistivity and a high withstanding voltage.

The plurality of internal electrodes 3 is each composed of a metallic material such as Ni (nickel), and formed within the ceramic substrate 2. In the example of FIGS. 1A and 1B, some of the internal electrodes 3 constitute a left internal electrode group 3a, whereas the other internal electrodes 3 constitute a right internal electrode group 3b. The internal electrodes 3 of the internal electrode group 3a each extracted to the left end surface of the ceramic substrate 2 extend from the left end surface toward the right end. On the other hand, the internal electrodes 3 of the internal electrode group 3b extracted to the right end surface of the ceramic substrate 2 extend from the right end surface toward the left end. In addition, the internal electrode groups 3a, 3b are arranged so as to fit in with each other vertically at predetermined intervals in front view.

The external electrodes 4a, 4b are composed of, for example, a NiCr alloy (nichrome alloy), a NiCu alloy (nickel copper alloy), and Ag (silver). Specifically, for the external electrodes 4a, 4b, a NiCr alloy, a NiCu alloy, and Ag are stacked in this order from the lower-layer side toward the upper-layer side. The external electrodes 4a, 4b are formed on the left end surface and right end surface of the ceramic substrate 2 so as to provide electrical conduction to the internal electrode groups 3a, 3b.

Furthermore, the first plating films 5a, 5b are composed of, for example, Ni, and formed on the external electrodes 4a, 4b, respectively. The second plating films 6a, 6b are composed of, for example, Sn (tin), and formed on the first plating films 5a, 5b, respectively.

(Example of Method for Manufacturing Laminated PTC Thermistor Element)

The manufacturing process for the laminated PTC thermistor element 1 generally includes the following first to eighth steps.

The first step is as follows. First, powders of $BaCO_3$, $TiO_2$, and $Sm_2O_3$ are prepared which are starting materials (that is, raw materials) for the ceramic substrate 2, weighed to meet the following formula (1), and then compounded.

$$(Ba_{1-x}Sm_x)_y TiO_3 \tag{1}$$

where x represents the molar ratio of the additive amount of Sm to Ba. In addition, y represents the molar ratio (Ba site/Ti site) of the Ba site to the Ti site in the $BaTiO_3$ based ceramic. In the present embodiment, x is 0.0005 to 0.0040, and y is 0.990 to 1.005.

In the present embodiment, the three kinds of starting materials mentioned above are selected for the targeted calcined powder grain size. This selection of the starting materials and the following grain size control technique for the calcined powder control the average porcelain grain size d of the ceramic substrate 2 in the case of a finished product, to a target value (0.3 [μm] or more, 1.2 [μm] or less).

In the next second step, the calcined powder is subjected to grain size control (grain refining). Specifically, first, pure water is added to the powder obtained by the mixing in the first step. The powder with the pure water added thereto is subjected to mixing and grinding for 16 hours along with zirconia balls, and then dried. This ground product is subjected to calcination for 2 hours at approximately 1100° C., thereby providing a calcined powder.

In the next third step, an organic binder, a dispersant, and water are added to the calcined powder obtained in the second step. These are mixed for several hours along with zirconia balls, thereby providing ceramic slurry. This ceramic slurry is formed into the shape of a sheet by a doctor blade method or the like, and then dried. As a result, ceramic green sheets are obtained. The sheets (that is, unfired ceramic layers 21) are, for example, 30 to 60 [μm] in thickness.

In the next fourth step, a Ni metal powder and an organic binder are dispersed in an organic solvent, thereby producing a conductive paste for Ni internal electrodes. This conductive paste is used to print patterns for the internal electrodes 3 on principal surfaces of the ceramic green sheets by screen printing. In this case, the patterns are printed so as to be 0.5 to 2.0 [μm] in thickness after being sintered. This fourth step provides ceramic green sheets with internal electrodes.

In the next fifth step, first, the multiple ceramic green sheets with the internal electrodes are stacked. On both the face and reverse sides of the laminated sheet material, a predetermined number of ceramic green sheets with no internal electrode 3 printed is applied by pressure bonding. The laminated sheet material composed of the two types of ceramic green sheets is subjected to pressure bonding, and then cut into raw ceramic chips of predetermined size.

In the next sixth step, the raw ceramic chips obtained in the fifth step described above are subjected to degreasing treatment for approximately 12 hours at approximately 300° C. in the atmosphere. Thereafter, the raw chips subjected to the degreasing treatment are subjected to firing for 2 hours at a temperature of 1180° C. to 1240° C. under a reducing atmosphere of N2/H2. Thus, a ceramic sintered body is obtained.

In the next seventh step, the ceramic sintered body obtained in the sixth step described above is coated with glass, and then subjected to heat treatment at approximately 700° C. under the air atmosphere. Thus, a glass layer is formed on the ceramic sintered body, and furthermore, the ceramic sintered body is reoxidized.

In the next eighth step, the reoxidized ceramic sintered body is subjected to barrel polishing, and thereafter, on both right and left end surfaces of the body, the external electrodes 4a, 4b are formed by sputtering in the order of Cr, NiCu, and Ag. Finally, on the surfaces of the external electrodes 4a, 4b, the first plating films 5a, 5b of Ni are formed first by electrolytic plating, and thereafter, the second plating films 6a, 6b of Sn are formed on the first plating films 5a, 5b.

In the case of the present embodiment, the calcined powder is subjected to grain refining in the first step and the second step. This grain refining enhances the reoxidation in the subsequent step.

Figure 2A:
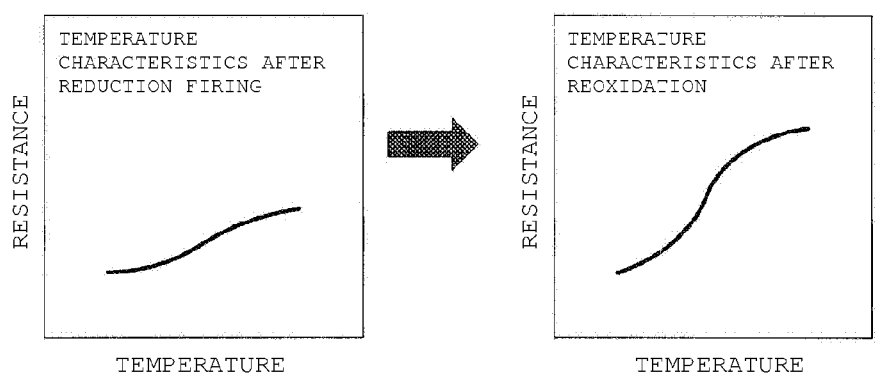
FIG. 2A is a pattern diagram showing resistance value characteristics of a ceramic sintered body with respect to temperature, through reduction firing and reoxidation.
Figure 2B:
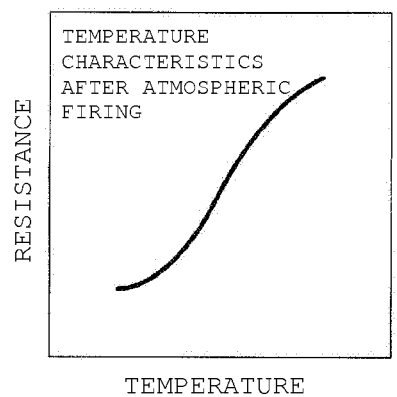
FIG. 2B is a pattern diagram showing resistance value characteristics of a ceramic sintered body with respect to temperature, through oxidation firing.

Furthermore, reduction firing is carried out in the sixth step. The present embodiment uses not atmospheric firing, but the reduction firing. The reduction firing is used in order to prevent the internal electrodes 3 of base metal such as Ni from being oxidized. However, in the case of only the reduction firing, the resistance change of the ceramic substrate 2 is slow with respect to the temperature change thereof as shown in the left side of FIG. 2A. It is to be noted that, for reference, in the case of the atmospheric firing, the change is rapid reversely as shown in FIG. 2B, while Ni as a material of the internal electrodes 3 is oxidized.

Figure 3A:
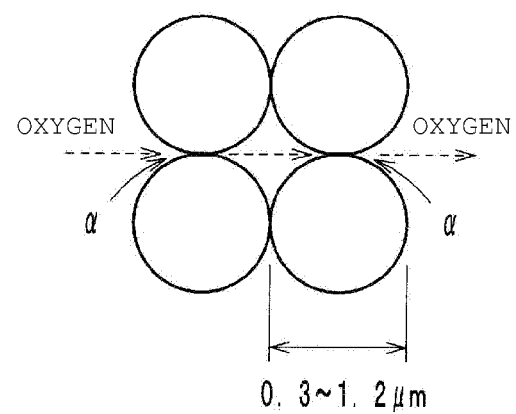
FIG. 3A is a pattern diagram showing reoxidation in the case of 0.3 [μm] or more and 1.2 [μm] or less in average porcelain grain size.
Figures 3B, 4A:
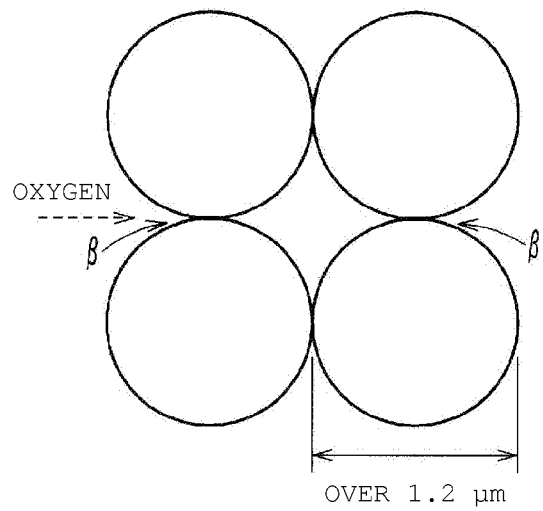
FIG. 3B is a pattern diagram showing reoxidation in the case of over 1.2 [μm] in average porcelain grain size.
FIG. 4A is a diagram which lists the average porcelain grain size, room-temperature resistivity, relative density, and withstanding voltage for samples 1 to 19.

The reoxidation is carried out in the seventh step. In the present embodiment, oxygen is more likely to spread all over the ceramic substrate 2, because the grain refining of the calcined powder reduces the grain boundaries (indicated by arrows α) between ceramic grains as shown in FIG. 3A. More specifically, the reoxidation is enhanced. This reoxidation makes the resistance change of the ceramic substrate 2 rapid with respect to the temperature change thereof as shown in the right side of FIG. 2A, thereby making it possible to improve the PTC characteristics. If the sintered density is merely increased without the grain refining of the calcined powder, individual ceramic grains are increased in grain size to increase the grain boundaries (indicated by arrows β), as shown in FIG. 3B. As a result, the degraded reoxidation causes failure to achieve favorable PTC characteristics.

The present inventors prepared the laminated PTC thermistor element 1 which meets, for example, the following conditions by the manufacturing method described above.

Design Target Values of Ceramic Substrate 3: length L=2.0 [mm], width W=1.2 [mm], thickness T=1.0 [mm]

Materials for Ceramic Substrate 3: dielectric ceramic containing $BaTiO_3$ as its main constituent Thickness of Fired Ceramic Layer 21: 24 [μm]
Material of Internal Electrode 3: Ni
Thickness of Fired Internal Electrode 3: 1 [μm]
Distance between Two Adjacent Internal Electrodes 3: 30 [μm]
The Total Number of Internal Electrodes 3: 24 [sheets]
Material of Lowest Layers of External Electrodes 4a, 4b: NiCr alloy of 0.13 [μm] in thickness
Material of Intermediate Layers of External Electrodes 4a, 4b: NiCu alloy of 1.2 [μm] in thickness
Material of Uppermost Layers of External Electrodes 4a, 4b: Ag of 0.8 [μm] in thickness
Material of First Plating Films 5a, 5b: Ni
Material of Second Plating Films 6a, 6b: Sn (Relationship between Average Porcelain Grain Size and Relative Density of Ceramic Substrate 2)

The present inventors prepared 19 kinds of finished products (hereinafter, which may be respectively referred to as samples 1 to 19) by varying the conditions in the manufacturing method described above, and figured out the average porcelain grain size (average crystal grain size) d for each ceramic substrate. The average porcelain grain size d is defined and figured out as follows.

A finished product (laminated PTC thermistor element) is polished until reaching half the size thereof in the Y-axis direction, thereby exposing an element cross section parallel to the ZX plane. Next, the cross section of the thermistor element is observed at an accelerating voltage of 5 [kV] and 10000-fold magnification with the use of a scanning electron microscope (JSM-7500FA from JEOL Ltd.) to obtain a SEM observation image. The ceramic part between two internal electrodes in a central part of the ceramic substrate in this SEM observation image is subjected to an image analysis with the use of an analyzer (IP-1000 from ASAHI ENGINEERING CO., LTD.) to figure out the areas of ceramic grains in the SEM observation image. Then, the diameters of circles with the same areas as the grain areas are calculated as porcelain grain sizes. The average porcelain grain size d refers to an average value for respective grain sizes completely contained in the visual field (approximately 18 [μm] square to approximately 20 [μm] square) of the SEM image observed.

Furthermore, the present inventors figured out the relative density R for each ceramic substrate of 0.3 to 1.2 [μm] in average porcelain grain size d. The relative density is defined as follows. First, it is extremely difficult to measure the weight per ceramic substrate, because the ceramic substrate is very light in weight. Therefore, the total weight of ten ceramic substrates was measured with an electronic balance, and thereafter, the total volume of the ten ceramic substrates was figured out after measuring the length L', width W', and thickness T' of each ceramic substrate. Next, the total weight was divided by the total volume to calculate the substrate density. The relative density R refers to the value obtained by dividing the substrate density by the theoretical density 6.02 [g/cm$^3$] of $BaTiO_3$. It is to be noted that the density measurement is calculated with the use of the ceramic substrate subjected to the reduction firing, which is not subjected to the glass coating and reoxidation treatment, because the change in density is extremely small between before and after the glass coating and reoxidation treatment. In addition, because of minute amounts of accessory constituents such as Sm, the theoretical density of $BaTiO_3$ is used for the sake of convenience for the calculation of the relative density.

Furthermore, the present inventors measured the room-temperature resistivity and withstanding voltage for each ceramic substrate of samples 1 to 19, with the use of an ammeter (EKE21-291 from Advantest Corporation) and a voltmeter (EKE22-251 from Advantest Corporation).

FIG. 4A is now a diagram which lists the average porcelain grain size d, relative density R, room-temperature resistivity, and withstanding voltage for samples 1 to 19. As shown in FIG. 4A, samples 2 to 6, 8, and 11 to 16 (marked with G that means Good) achieve a balance between a low room-temperature resistivity of 30 [Ωcm] and a high withstanding voltage of 730 [V/mm], which is a practically preferred value. In contrast, samples 1, 7, 9, 10, and 17 to 19 (in the figure, marked with NG that means No Good) fail to achieve a balance between a low room-temperature resistivity and a high withstanding voltage.

Figures 4B, 5:
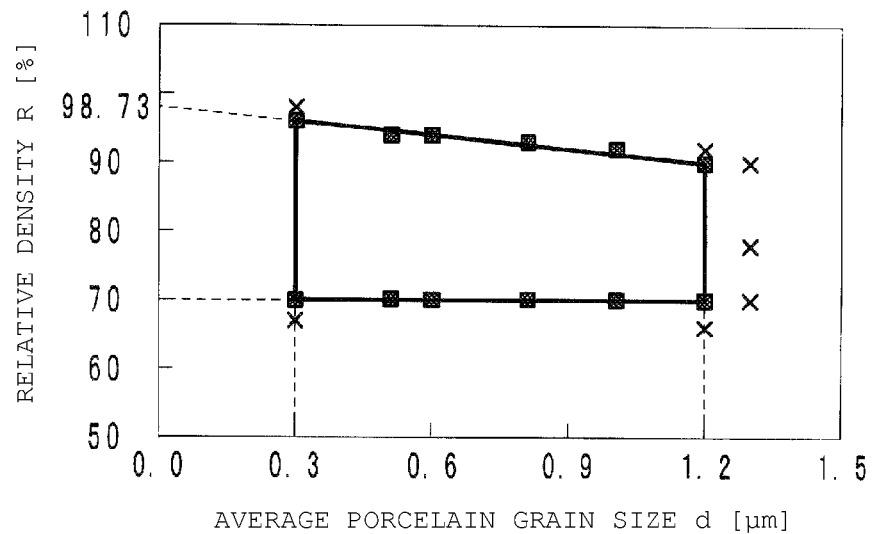
FIG. 4B is a graph showing the relative density with respect to the average porcelain grain size shown in FIG. 4A.
FIG. 5 is a diagram which lists details on the size of the ceramic substrate shown in FIG. 1A.

In addition, FIG. 4B is a graph where the relative density R with respect to the average porcelain grain size d is plotted as "■" for samples 2 to 6, 8, and 11 to 16. From FIG. 4B, it is determined that what is required is to meet the conditions (A) and (B) mentioned above in order to achieve a balance between a low room-temperature resistivity and a high withstanding voltage as mentioned above. It is to be noted that in FIG. 4B, for reference, the relative density R with respect to the average porcelain grain size d is also plotted as "x" for samples 1, 7, 9, 10, and 17 to 19 as NG.

(Additional Statements)

In the embodiment described above, the surface-mounted PTC thermistor element has been explained. However, the method for mounting the PTC thermistor element onto a printed circuit board is not limited to the surface-mounted type, but may be a BGA (BallGrid Array) type.

In addition, in the present embodiment, the ceramic substrate 2 has been described as the 2012 size. However, the ceramic substrate 2 is not limited to this size, but may be 3225 size, 3216 size, 1608 size, 1005 size, 0603 size, or 0402 size. On behalf of these six types of sizes, the 3225 size will be described in detail. As for the 3225 size, the design target value L of the length in the horizontal direction is, for example, 3.2 [mm], and the design target value W of the width in the front-back direction is, for example, 2.5 [mm]. Further, the thickness in the height direction is not to be considered particularly defined, but preferably 1.0 [mm] or less. Also as for the 3225 size, the L, W, and T are not always exactly the numerical values mentioned above, but have tolerances. The other five types of sizes are as described in FIG. 5.

In addition, in the embodiment described above, the external electrodes 4a, 4b have the multi-layer structure including the NiCr alloy, NiCu alloy, and Ag, in consideration of junctions with each internal electrode 3, etc. However, the materials for the external electrodes 4a, 4b are not limited to this structure, but may be appropriately selectable, and may have, for example, a multi-layer structure including Cr (chromium), a NiCu alloy, and Ag.

In addition, in the present embodiment, the first plating films 5a, 5b and the second plating films 6a, 6b are made respectively by Ni plating and Sn plating, in consideration of compatibility with the external electrodes 4a, 4b including silver as the uppermost layers. However, the materials for the first plating films 5a, 5b and the second plating films 6a, 6b, which are not limited to the foregoing, are selected appropriately depending on the material of the external electrodes 4a, 4b.

Furthermore, in the embodiment described above, $BaCO_3$ and $TiO_2$ were used as the ceramic raw materials. However, the barium source, which is not limited to the foregoing, may be a barium compound such as a barium carbonate or a barium hydroxide. In addition, the titanium source may be a titanium compound such as a titanium dioxide or a titanium hydroxide.

Moreover, this application claims the priority on the basis of Japanese Patent Application No. 2012-164384 filed with the Japan Patent Office on Jul. 25, 2012, the content of which is entirely incorporated herein by reference in its entirety.

The laminated PTC thermistor element according to the present invention achieves a balance between a low room-temperature resistivity and a high withstanding voltage, and is preferred for overcurrent protection of electronic devices such as cellular phones and personal computers.

DESCRIPTION OF REFERENCE SYMBOLS 1 laminated PTC thermistor element
2 ceramic substrate
21 ceramic layer
3 plurality of internal electrodes
3a, 3b internal electrode group
4a, 4b external electrode
5a, 5b first plating film
6a, 6b second plating film

The invention claimed is:

1. A laminated PTC thermistor element comprising:
   a ceramic substrate having a plurality of ceramic layers;
   a plurality of internal electrodes within the ceramic substrate; and
   an external electrode on a surface of the ceramic substrate and electrically connected to the internal electrodes,
   wherein the ceramic substrate is 0.3 [μm] or more and less than 0.5 [μm] in average porcelain grain size,
   a relative density of the ceramic substrate has a lower limit of 70 [%], and
   the relative density of the ceramic substrate has an upper limit of −6.43d+97.83 [%] when the average porcelain grain size is denoted by d.

2. The laminated PTC thermistor element according to claim 1, wherein the laminated PTC thermistor element has a room-temperature resistivity of 30 [Ωcm] or less.

3. The laminated PTC thermistor element according to claim 2, wherein the laminated PTC thermistor element has a withstanding voltage of 730 [V/mm] or more.

4. The laminated PTC thermistor element according to claim 1, wherein the laminated PTC thermistor element has a withstanding voltage of 730 [V/mm] or more.

5. The laminated PTC thermistor element according to claim 1, wherein the ceramic substrate is $BaTiO_3$ having a rare earth element added thereto.

6. The laminated PTC thermistor element according to claim 5, wherein the rare earth element is selected from the group consisting of Sm, Nd and La.

7. The laminated PTC thermistor element according to claim 1, wherein
   the plurality of internal electrodes include a first plurality of internal electrode and a second plurality of internal electrodes,
   the external electrode is a first external electrode on a first surface of the ceramic substrate and electrically connected to the first plurality of internal electrodes,
   the laminated PTC thermistor element further comprising:
   a second external electrode on a second surface of the ceramic substrate and electrically connected to the second plurality of internal electrodes.

* * * * *